D. M. LEMON.
MACHINE FOR CUTTING BUTTER, &c.
APPLICATION FILED APR. 17, 1909.

927,734.

Patented July 13, 1909.
2 SHEETS—SHEET 1.

Witnesses
Stuart Hilder.
George M. Anderson.

Inventor
Don M. Lemon
By
E. W. Anderson
his Attorney

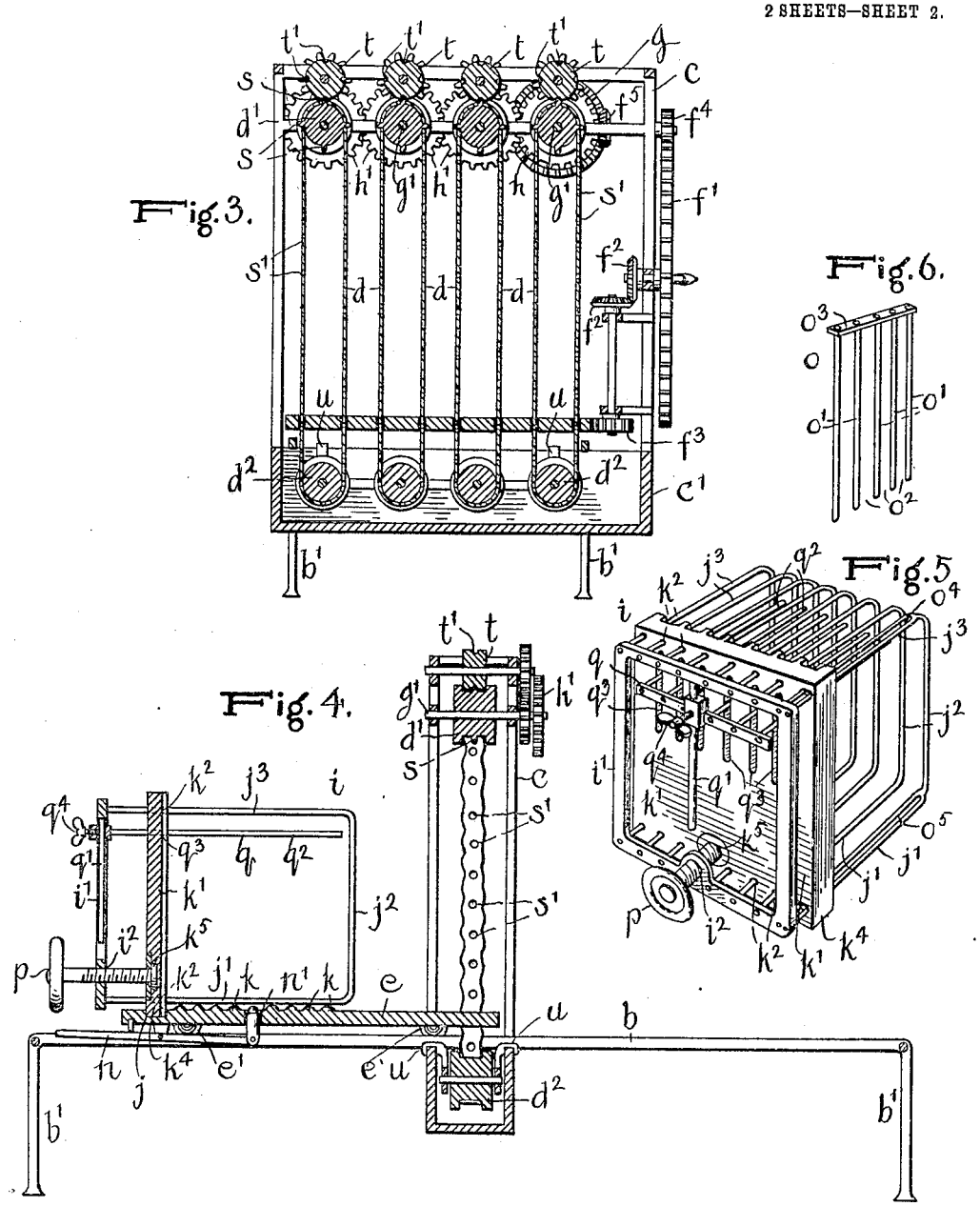

UNITED STATES PATENT OFFICE.

DON M. LEMON, OF BOSTON, MASSACHUSETTS.

MACHINE FOR CUTTING BUTTER, &c.

No. 927,734.  Specification of Letters Patent.  Patented July 13, 1909.

Application filed April 17, 1909. Serial No. 490,554.

*To all whom it may concern:*

Be it known that I, DON M. LEMON, a citizen of the United States, resident of Boston, in the county of Suffolk and State of Massachusetts, have made a certain new and useful Invention in Machines for Cutting Butter, &c.; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
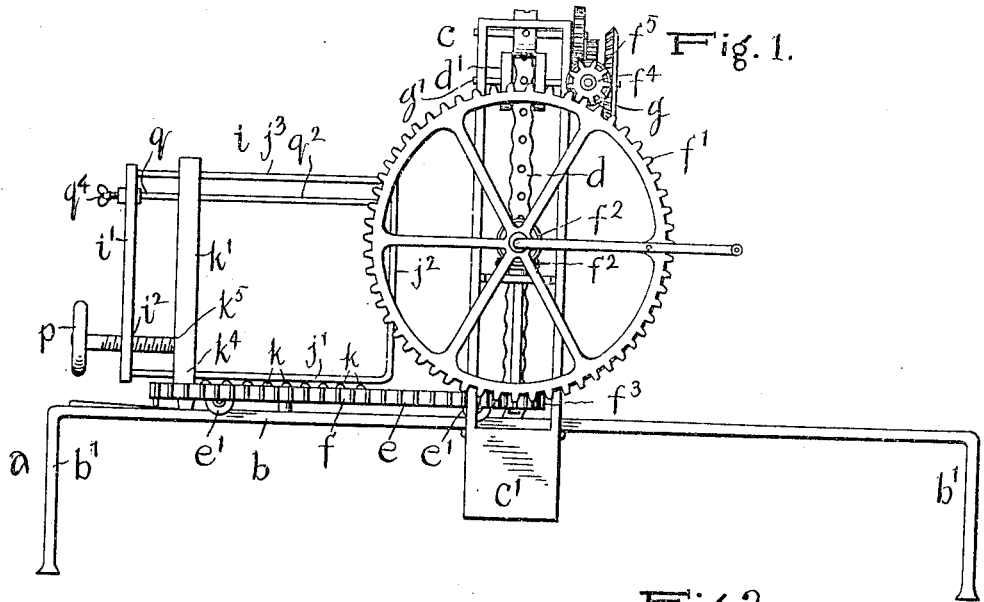
Figure 2:
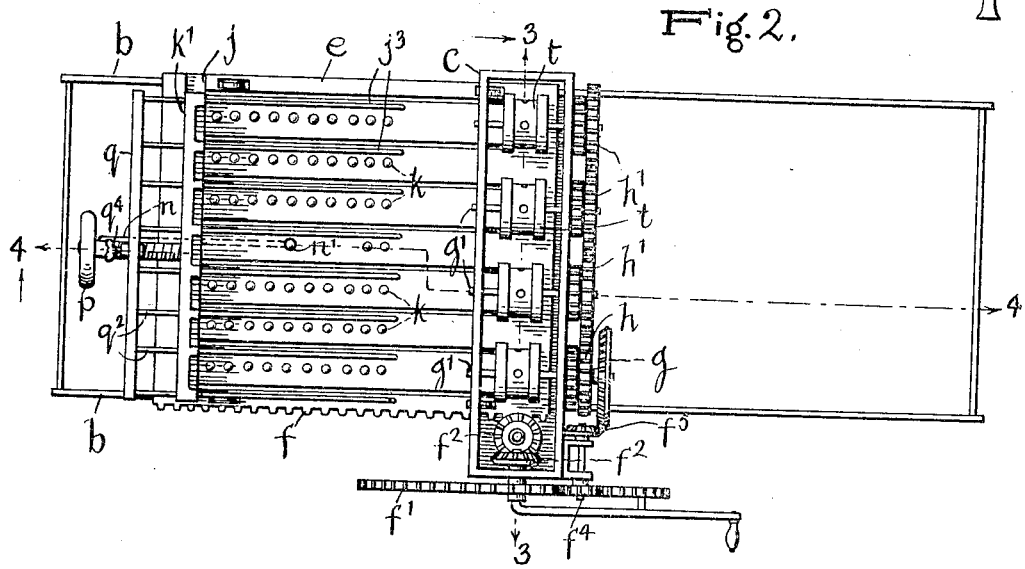
Figure 7:
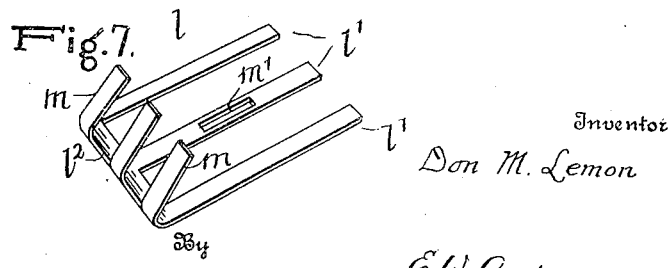

Figure 1 is a side view of the machine with the carrier in position upon the table or bed thereof. Figure 2 is a plan view of the same. Fig. 3 is a section on the line 3—3, Fig. 2. Fig. 4 is a section on the line 4—4, Fig. 2. Fig. 5 is a detail perspective view of the carrier. Fig. 6 is a similar view of the end rest of the carrier. Fig. 7 is a similar view of the rest or support for engagement with the bottom of the block of butter.

The invention has relation to machines for cutting butter, having for its object the provision of a machine capable of use upon the counter for quickly and economically separating a large block or tubful of butter into cakes of convenient size. The machine is equally capable of use to cut cheese, bread and similar food substances.

Other objects and advantages will hereinafter appear.

The invention consists in the novel construction and combinations of parts as hereinafter set forth.

In the accompanying drawings, illustrating the invention, the letter $a$, designates a supporting frame, which may consist of two longitudinal rail or track bars $b$, $b$, braced transversely and having legs $b'$, $b'$, at each end. Mounted centrally of this frame is a stand $c$, having a pan $c'$, below the frame bars $b$, $b$, and carried by this stand are endless band saws $d$, $d$, provision for four being shown, these saws being carried by wheels $d'$, $d'$, having journal bearings in the upper portion of said stand, and wheels $d^2$, $d^2$, having journal bearings within the pan $c'$, which is designed to contain water or other suitable liquid for cleaning, heating or moistening the saws in their movement therethrough.

$e$, is a platform having wheels $e'$, $e'$, at each end for movement upon the rails $b$, $b$, said platform having a series of rack teeth $f$, at one side with which a large spur gear wheel $f'$, having journal bearings in the stand $c$, has driving connection, through bevel gears $f^2$, $f^2$, and pinion $f^3$. This wheel $f'$, has at its upper end engagement with a pinion, $f^4$, the shaft of which carries a small miter gear $f^5$, in mesh with a similar gear $g$, on one of the saw wheel shafts $g'$, said shaft carrying a small spur gear or pinion $h$, having engagement with a train of pinions $h'$, $h'$, $h'$, upon the shafts of the other saw carrying wheels. Thus upon rotation of the large spur gear $f'$, the table or platform will be slowly moved along the rails of the stand while the endless saws will at the same time be given a rapid movement.

The table $e$, is dotted with small knobs or protuberances $k$, $k$, for the purpose partly of preventing objectionable adherence of butter to the table. The block of butter being first placed in position upon the table, it is caused to move by operation of the gearing until the butter has passed to the opposite side of the saws and been cut into a number of vertical sheets or strips, nine as shown.

$l$, is a rest formed of flat bars $l'$, $l'$, the channels between said bars being open at one end and connected at the opposite end at $l^2$, where the rest is provided with inward and upward extending branches $m$, $m$. A seat $m'$, is provided at the middle portion of the center bar $l'$. This rest is now slid underneath the subdivided block of butter, between the knobs $k$, $k$, and a lifting lever $n$, operated to cause its upturned end $n'$, to engage with this seat $m'$, raising the rest and the butter thereupon, when the butter and rest are turned upon the lever extension as a center to a position at right angles to the position formerly occupied, the rest and butter being then let down again upon the platform. The large spur gear is now turned to reverse the movement of the table or platform upon the rails of the stand, and the saws again passed through the butter, dividing the vertical sheets or subdivisions into still smaller vertical subdivisions in planes at right angles to the first cutting planes. The original block of butter is now subdivided by vertical cuts at right angles to each other into vertical blocks, and it is desired to further divide it into horizontal blocks or cakes. To this end a carrier $i$, is provided for the butter, having a skeleton-form side portion $i'$, and parallel horizontal wires or rods $j'$, having vertical upward extensions $j^2$, and top horizontal connections $j^3$, with the part $i$, the channels between the rods of the carrier being open at the inner ends for free passage of the saws. For the purpose of holding the block of butter firmly in position along its vertical walls in the carrier $i$, a vertical pressure piece $k'$, is provided having upper and lower perforations $k^2$, $k^2$, engaging in a sliding manner the upper and lower rods $j'$, $j'$, and $j^3$, $j^3$. This pressure piece is thicker and heavier than the other parts of the carrier and forms the main support therefor, having a lower squared extension $k^4$, designed to closely engage in a sliding, supporting manner a transverse squared groove $j$, of the table. An adjusting screw $p$, having threaded engagement with the part $i'$, at $i^2$, and rotary bearing in the part $k'$, at $k^5$, is designed upon rotation to move the carrier $i$, upon which the butter rests until the vertical extensions $j^2$, $j^2$, and the pressure piece $k'$, engage the vertical walls of the butter block to hold the same securely. A horizontal pressure piece $q$, has sliding engagement with a depending rod $q'$, of the part $i'$, for the purpose of exerting pressure upon the top wall of the butter block. The piece $q$, has horizontal pressure arms $q^2$, $q^2$, passing through slots $q^3$, $q^3$, of the pressure piece $k'$, and is provided with a set screw $q^4$, having bearing against the rod $q'$, to fix the adjustment. The skeleton-form rest $l$, is now withdrawn from beneath the subdivided block of butter, when the carrier $i$, is placed endwise over the butter until the end of the carrier rests upon the table, a rest $o$, consisting of parallel rods or wires $o'$, $o'$, the channels between the same being open at one end as shown at $o^2$, and closed at the opposite ends by connecting bars $o^3$, being slid underneath the butter between the knobs $k$, $k$, of the table into engagement with a slot seat $o^4$, of the bar $j^3$, at one end of the carrier. The carrier is now swung at one end thereof upon the table or platform with the butter resting upon the rods $j'$, $j'$, and $o'$, $o'$, until the butter block rests upon its side upon the carrier and the squared lower end $k^4$, of the pressure piece $k'$, rests in its squared seat or groove $j$, of the table. The butter is next moved into engagement with the subdividing saws or wires to make the horizontal cuts, which are made however by vertical saws. These horizontal cuts are desired to be thinner or less far apart than the vertical cuts and it is for this reason that the carrier $i$, is made capable of adjustment transversely of the table.

The upper and lower saw carrying wheels are preferably grooved and the upper wheels are provided with small radial teeth $s$, $s$, having engagement with small perforations $s'$, $s'$, of the band saws to render more certain the movement of such saws with the wheels. One set of said carrying wheels, preferably the upper set, is provided with small auxiliary wheels $t$, $t$, which run in the grooves thereof and are provided with radial recesses $t'$, $t'$, for the reception of the teeth $s$, $s$, after they have passed through the perforations of the band saws for further assurance against escape of the band saws from the carrying wheels.

To avoid perforation of the walls of the pan carrying the cleaning liquid for the saws, the shafts of the lower saw carrying wheels $d^2$, $d^2$, are journaled in depending brackets $u$, $u$, having support from the upper edges of the pan.

The band saws have preferably a wave-like serpentine cutting edge, as shown.

Wires may be substituted for the band saws or jig saws may be used (not shown) and the movement of the saws may be reciprocatory if desired, without departing from the spirit of my invention.

The carrier $i$, is shown as adapted for use with a rectangular prismatic block of butter made from the usual frusto-conical tubful or block by cutting off the tapering edge portions thereof.

The saws may be cleaned or heated by the use of a flame if desired, the means for proving which are not shown.

Having thus described my invention, what I claim as new and desire to secure by Letters Patent is:

1. A cutting machine for butter and the like, having a series of parallel saws and means for moving said saws in unison.

2. A cutting machine for butter and the like, having a series of parallel saws, a table adapted to carry the substance to be cut, and means having driving connection with said table and saws for moving the table slowly and the saws rapidly.

3. A cutting machine for butter and the like, comprising a support, having a stand provided with a series of saws, and a table movable upon said support and adapted to carry the substance to be cut into engagement with said saws.

4. A cutting machine for butter and the like, comprising a support having a stand provided with a series of saws, a table movable upon said support and adapted to carry the substance to be cut into engagement with said saws, and means for moving said saws in unison.

5. A cutting machine for butter and the like, having a series of endless parallel saws, a reciprocatory table and means having driving connection with the table and saws for moving the table slowly and the saws rapidly.

6. A cutting machine for butter and the like, having a series of endless parallel saws having a serpentine cutting edge.

7. A cutting machine for butter and the like, having a series of endless parallel saws having a serpentine cutting edge, a table, and means for moving the table slowly and the saws rapidly.

8. A cutting machine for butter and the like, having a series of endless parallel saws, a reciprocatory table having a series of rack teeth, a large gear wheel having engagement with the rack teeth of the table and geared with the shafts of said saws.

9. A cutting machine for butter and the like, having a series of endless parallel saws, upper and lower carrying wheels for the same, one set of said carrying wheels having a train of pinions upon the shafts thereof, a table having a series of rack teeth, and a large gear wheel having driving connection with the rack teeth of the table and with said pinions.

10. A cutting machine for butter and the like, having a series of parallel saws, upper and lower carrying wheels for the same, one set of said carrying wheels having a train of pinions upon the shafts thereof, a table having a series of rack teeth, a large gear wheel in driving connection with the rack teeth of the table and with said pinions, and a pan for cleaning liquid in which the saws dip at their lower ends.

11. A cutting machine for butter and the like, having a series of endless parallel saws provided with small perforations, and upper and lower carrying wheels for said saws, one set of said carrying wheels having small teeth for engagement with the saw perforations.

12. A cutting machine for butter and the like, having a series of endless parallel saws provided with small perforations, upper and lower carrying wheels for the saws, one set of said carrying wheels having small teeth for engagement with the saw perforations and a set of wheels having small peripheral recesses having engagement with the teeth of the saw carrying wheels after such teeth have passed through said perforations.

13. A cutting machine for butter and the like, comprising a support having parallel rails and a stand, said stand having upper and lower wheels and a series of endless saws carried thereby, and a table movable upon the rails of said support.

14. A cutting machine for butter and the like, comprising a support having parallel rails and a stand, said stand having upper and lower sets of wheels and endless saws carried thereby, a table movable upon the rails of said support and having a series of rack teeth, and a large gear wheel having driving connection with said rack teeth and with said saws.

15. A cutting machine for butter and the like, comprising a support having parallel rails and a stand, said stand having upper and lower sets of wheels and a series of endless saws carried thereby, a table movable upon the rails of said support and having small knobs or protuberances upon its upper face, a detachable rest and a lever pivoted to said table and adapted to lift said rest with the butter thereupon.

16. A cutting machine for butter and the like, comprising a support having parallel rails and a stand, said stand having upper and lower sets of wheels and a series of endless saws carried thereby, a table movable upon said rails and provided with a transverse squared groove, a detachable carrier having a side piece provided with a squared lower edge for sliding and supporting engagement with said groove, said carrier having parallel supporting bars, a detachable rest having engagement with the carrier at one end thereof, and a pressure piece for the carrier.

In testimony whereof I affix my signature, in presence of two witnesses.

DON M. LEMON.

Witnesses:
OLA H. GOULD,
JOHN D. GREENAWAY.